United States Patent
Balin et al.

(10) Patent No.: US 6,983,654 B2
(45) Date of Patent: Jan. 10, 2006

(54) LIQUID LEVEL MEASURING DEVICE

(76) Inventors: Nikolai Ivanovich Balin, Moskovskoe shosse, 10-73, St. Petersburg, 196158 (RU); Aleksandr Petrovich Demchenko, nab.r. Moiki, 42-5, St. Petersuburg. 191186 (RU)

( * ) Notice: Subject to any disclaimer, the term of this patent is extended or adjusted under 35 U.S.C. 154(b) by 0 days.

(21) Appl. No.: 10/816,305

(22) Filed: Apr. 1, 2004

(65) Prior Publication Data
US 2004/0182149 A1    Sep. 23, 2004

Related U.S. Application Data

(63) Continuation of application No. PCT/RU02/00134, filed on Mar. 21, 2002.

(30) Foreign Application Priority Data
Oct. 5, 2001    (RU) ............................... 2001127653

(51) Int. Cl.
*G01F 23/00* (2006.01)
(52) U.S. Cl. .................................... 73/290 V
(58) Field of Classification Search ............. 73/290 V, 73/290 R
See application file for complete search history.

(56) References Cited

U.S. PATENT DOCUMENTS

| | | | |
|---|---|---|---|
| 3,394,589 A * | 7/1968 | Tomioka | 73/290 V |
| 4,130,018 A * | 12/1978 | Adams et al. | 73/290 V |
| 5,301,549 A * | 4/1994 | Sinclair | 73/290 V |
| 5,471,872 A | 12/1995 | Cummings | |
| 6,232,769 B1 * | 5/2001 | Brunsch et al. | 324/207.13 |
| 6,272,921 B1 * | 8/2001 | Ivanovich et al. | 73/290 V |
| 6,612,168 B2 * | 9/2003 | Barr et al. | 73/290 V |

FOREIGN PATENT DOCUMENTS

| FR | 2 672 678 | 8/1992 |
|---|---|---|
| SU | 599203 | 3/1978 |

* cited by examiner

Primary Examiner—John E. Chapman
Assistant Examiner—Rodney T. Frank
(74) Attorney, Agent, or Firm—Houston Eliseeva LLP

(57) ABSTRACT

The invention provides a liquid level detector using parameter measurements of sound waves passing along the waveguide and reflected from the surface of the liquid. The detector contains a membrane acoustical-electrical transducer in the case and the acoustic waveguide with reflectors immersed in liquid. The acoustic waveguide is a tube or several tubes and is connected to the detector case by a sleeve coupling. Inside the sleeve coupling is an acoustic matching unit between the membrane of the acoustical-electrical transducer and the inlet of the waveguide with the cavity connected with the cavity of the waveguide by means of the diaphragm with the channel. The case of the acoustical-electrical transducer is connected to the detector case through a damping element providing acoustic decoupling between the acoustical-electrical transducer and the main case of the detector. The end of the acoustic waveguide may be connected to a Γ-shaped or T-shaped intermediate waveguide.

27 Claims, 6 Drawing Sheets

LIQUID LEVEL MEASURING DEVICE

RELATED APPLICATIONS

This application is a continuation of International Application No. PCT/RU02/00134, filed Mar. 21, 2002, claiming priority of Russian patent application No. 2001127653, filed Oct. 5, 2001. The entire teachings of these applications are incorporated herein by reference.

BACKGROUND OF THE INVENTION

The invention relates to liquid level indicators using parameters measurements of sound waves passing along the waveguide and reflected from the surface of the liquid.

As a rule, measuring devices with a waveguide contain reflectors arranged on the waveguide. A sound wave of an impulse acoustic signal propagates along a part of the waveguide which is situated aloft being reflected from the reflectors arranged at known distances and reflects as well from the surface of the liquid. The distance is determined by measuring the propagation time of echo signals. The signals from reflectors serve for calibration and improvement of measurement accuracy.

The USSR author's certificate No. 560144 with the priority to Jan. 21, 1975, Int. Cl. G01F23/28, "Liquid Level Detector" is known that contains an acoustic channel made in the form of a hollow tube with a hole immersed into liquid at the end of which a receiving and emitting device is installed outside the liquid. The internal surface of the acoustic channel is provided with the grooves that form shelves directed towards the receiving and emitting device.

The invention according to the U.S. Pat. No. 4,909,080 with the priority to Aug. 29, 1988, "Ultrasound liquid level detector in a tank" contains a transmitter-receiver and a hollow tube waveguide.

The "Level detector with an acoustic waveguide" according to the French application 2596515, Int. Cl. G01F23/28, has a transducer fixed beyond the liquid and emitting an impulse to a long waveguide whose lower part is immersed into the liquid.

The inventions according to the applications of Great Britain 2265005 and 2265219 with the same priority to Mar. 21, 1992, Int. Cl. G01F23/28, "Liquid Level Detector" are known. A detector contains a tube with a set of reflectors arranged along the length of the tube going upwards from a transducer. Liquid fills the tube to the same level as outside of the tube. There is a layer of sound absorbing mass on the inside surface of the tube. The height of the liquid surface according to the second invention is calculated with regard to the difference between propagation times of the impulses reflected by the two highest and located in liquid reflectors and the difference between propagation times of impulses reflected from the liquid surface and the highest reflector.

The U.S. Pat. No. 5,471,872 with the priority to Jan. 7, 1994, Int. Cl. G01F23/296, "Acoustic Liquid Level Indicator" contains the first acoustic waveguide to which in the process of work acoustic transmitter and receiver are connected and the second acoustic waveguide containing reference reflectors in the form of the holes. The waveguides are connected by a corner section where reflectors meant for angular reflection are installed.

The invention according to the European application EP 845663 with the priority to Nov. 21, 1997, Int. Cl. G01F23/296, "Method of liquid level measurement with the help of ultrasound echo signal" is known. A transducer is installed at the bottom of the reservoir with liquid and a tube with a bench mark is installed on the transducer. The liquid level measurement is performed with the help of a bench mark installed at the distance known beforehand.

The design according to the PCT application 9102950, Int. Cl. G01F23/28, "Method and Device for Liquid Level Detection in Reservoirs Using Acoustic Waveguide" contains the main channel of measurements and the reference one for sound speed measurement in the medium volume. Each channel contains a transmitter-receiver and a waveguide in the form of the tube extending from the bottom of the reservoir to the surface of the medium.

In the considered constructions the problem of acoustic matching of acoustical-electrical transducers of a membrane type having large internal resistance and operating aloft with waveguides is not solved which does not allow to raise radiating power and to increase measurement range.

The closest in the technical essence is the invention described in the application of France 2672678, Int. Cl. G01F23/28, "Method and device for the interface level measurement of two different liquids or liquid and gas". The device contains several reflectors arranged on a waveguide at different distances from an acoustical-electrical transducer.

The problem of good matching of the membrane acoustical-electrical transducer with the waveguide when working aloft is not solved in this construction as well.

SUMMARY OF THE INVENTION

The technical result achieved in the proposed invention consists in the solution of acoustical matching problem of the acoustical-electric membrane transducer and the waveguide aloft. The solution of the matching problem provides sufficient levels of signals reflected from liquid at limiting distances and minimal re-reflection from the beginning of the waveguide. The minimal levels of natural noise are achieved (because of the possible transducer vibration) as well as minimal re-reflections of signals from the beginning of the waveguide. Noise reduction leads to the accuracy improvement of distance measurement to liquid.

The above result is achieved by the following.

A device for liquid level detection contains a case of the device, an acoustical-electrical transducer and an acoustical waveguide with reflectors which is immersed into liquid.

In order for the device to be strong, explosion-safe, sustainable to pressure differentials, aggressive medium, acids vapors etc. the body (case) of the acoustical-electrical transducer itself may be made hermetic, and an emitting element may be made in the form of the metal membrane.

Such construction of the acoustical-electrical transducer allows creation of short acoustic impulses due to bending oscillations of the metal membrane. The acoustic waveguide may be made in the form of the tube or separate tubes and is connected to the main case of the device by means of rigid sleeve coupling. An acoustic matching unit with a cavity connected with a waveguide cavity by means of a diaphragm with a channel is made inside the sleeve coupling between the membrane of the acoustical-electrical transducer and a waveguide inlet.

The case of the acoustical-electrical transducer is connected to the main case of the device through a damping element which serves as acoustic and vibration decoupling between the case of the acoustical-electrical transducer and the case of the device.

The case of the device for liquid level detection is connected with the waveguide by means of the sleeve coupling, which on the one hand provides necessary rigidity of the construction, and on the other hand allows arranging the acoustic matching unit between the acoustical-electrical transducer and the waveguide.

Since the acoustical-electrical transducer is connected to the main body of the device through the damping element, transducer oscillations are not transferred to the body and further through the sleeve coupling to the walls of the acoustic waveguide which could create additional noise in case of reception because of the generation in the coupling and the walls of the acoustic waveguide of oscillations that, being propagated and reflected in separate construction details, may return to the acoustical-electrical transducer in the form of interference (noise). The acoustical-electrical transducer, in the reception mode, does not take, due to the damping element parasitic oscillations appearing in the waveguide, sleeve coupling, and case which may be vibrations of the construction at the operating frequency appearing because of the operation of extraneous mechanisms creating vibrations of the transducer units at the operating frequency.

The acoustic matching unit forms a cavity with a diaphragm with a channel between the membrane of the acoustical-electrical transducer and the waveguide. In the emitting mode, this cavity with the diaphragm matches high output acoustic resistance of the elastic membrane transducer with the low resistance of the load which is a part of the acoustic waveguide aloft. In the receiving mode the cavity with the diaphragm operates as a matching device in the reverse direction providing good conversion of acoustic wave energy of reflected legitimate signals from the liquid surface and reflectors into membrane oscillations of the acoustical-electrical transducer. It occurs because of matching of low resistance of the waveguide beginning which is a source of signals in the reception mode with the high resistance of the receiver (membrane of the acoustical-electrical transducer).

The usefulness of such matching may be seen from the following considerations. The rigid metal membrane may produce high pressures during relatively small displacement, and large displacements are used at rather low pressures (acoustic pressures) in order to achieve strong acoustic signal in air. This task is solved by the acoustic matching unit acting as an acoustic resonator converting small displacements of the membrane into large displacements of air at the input of the acoustic waveguide.

During the reception on the contrary, large air oscillations in the waveguide with small pressures are converted into small in amplitude air oscillations in the cavity of the acoustic matching unit but with higher pressure, it allows to "swing" the rigid membrane in the reception mode, thus increasing the sensitivity of the acoustical-electrical transducer to the signal from the acoustic waveguide.

The combination of features of this construction allows achieving maximal ratio of signal/noise at the output of the acoustical-electrical transducer which provides necessary distance range of the device operation in combination with high accuracy. Interferences that may be superimposed on the legitimate signal and are minimized in this construction include acoustic signals of two and more multiple re-reflections of acoustic impulses from the construction elements.

The acoustic matching unit may be made in the form of a cup from damping material with the channel in the diaphragm, in this case the cup cavity faces the membrane, and the channel in the diaphragm faces the opening of the sleeve coupling. In this case, a more accurate acoustic matching may be achieved together with additional absorption of re-reflected acoustic signals. Additional absorption of re-reflected acoustic signals may be achieved if the cup cavity is filled with porous material.

When the number of reflectors installed on the waveguide is large, an error is possible in determination of signals propagation time from separate reflectors because of superposition on the signal from not the first reflector, of a signal from the above placed reflector which underwent re-reflection from the upper end of the waveguide.

In order to eliminate this undesirable effect one may match the acoustical-electrical transducer with the waveguide in the reception mode. Such matching may be needed when reflected signals are completely absorbed by acoustical-electrical transducer membrane. In this device it is achieved by the presence of the acoustic matching unit which performs the role of the Helmholz resonator whose cavity is limited by acoustical-electrical transducer membrane. When adjusting the resonator in accordance with the given below relations, the acoustic energy of the reflected signals is completely absorbed by the resonator and finally is absorbed by the membrane, i.e. air acoustic energy converts completely into the energy of mechanical membrane oscillations of the acoustical-electrical transducer in the reception mode.

If the external surface of the cup faced to the sleeve coupling is covered with damping material, the possibility of vibrations penetration to acoustical-electrical transducer in the cold time of the year may be excluded because the surface of the cup may freeze to the surface of the sleeve coupling.

In a particular embodiment of the device, the cup may contain a bushing and a diaphragm with a channel in the form of a washer.

For the best matching, the cavity dimensions and the diaphragm dimensions should be connected by the approximate equation $$f_0 = \frac{c}{2\pi}\sqrt{\frac{S}{V \cdot L}} \quad (1)$$

where $f_0$—operating frequency of the acoustical-electrical transducer, c—speed of sound, S—cross-section area of the diaphragm channel, V—cavity volume, L—diaphragm channel length.

The acoustical-electrical transducer may be made hermetic in order to provide protection of the acoustical-electrical transducer device including piezoelectric element and circuit from vapors of aggressive liquids and in order to improve explosion-safety when working with combustion liquids.

For the convenience of assembling, the waveguide is made from separate tubes connected with each other by means of adapters. The reflectors are installed at the tubes joints and are made, for example, in the form of the reflector washers with the diameter that differs from the internal diameter of the tube.

The reflectors along the tube length may be implemented in the form of the holes or in the form of the rods fixed in the inside walls of the tubes.

Non-uniformities in the tube material are formed when the reflectors are implemented as holes from which acoustic waves propagating in the tube body reflect additionally.

If measurements are performed in the medium with the pressure higher that the atmospheric pressure, compensation holes are made in the acoustical-electrical transducer case and acoustic matching unit in order to equalize pressure between the acoustic waveguide cavity and the internal cavity of the acoustical-electrical transducer. A filter opaque to moisture and vapors but permeable to gas may be installed in the compensation hole of the acoustical-electrical transducer case.

In another embodiment, the end of the acoustic waveguide is connected to an intermediate waveguide made in the Γ-shaped or T-shaped form. The part of the intermediate acoustic waveguide which is situated at an angle to the acoustic waveguide may be attached to the device body by sleeve coupling. In other respects, the construction is identical to the first version.

In this case, the device body, acoustical-electrical transducer, and sleeve coupling are arranged at an angle to the axis of the acoustic waveguide.

In order to provide acoustic matching of the acoustical-electrical transducer and acoustic waveguide, the section of the intermediate waveguide from the sleeve coupling to the axis of the main waveguide should have the length equal to the integer number of the half-wavelengths in the range of $$(1 \div 3) \cdot \frac{c}{2f_0} \quad (2)$$

where $f_0$—operating frequency of the acoustical-electrical transducer, c—speed of sound.

The length of the end part of the waveguide should also be multiple of an integer number of half-waves of the acoustic signal i.e. correspond to the condition (2) when the waveguide has the T-shape A ball valve may be installed in order to have the possibility to wash the waveguide and to perform measurements of liquid level through the waveguide tube by contact methods at the bend of the Γ-shaped or T-shaped intermediate waveguide. At one position of the valve, the cavity of the acoustic matching unit is connected with the waveguide cavity, and in another position, the waveguide cavity is connected with the environment. Combination of the invention features provides the constructions in both embodiments with earlier unknown, not evident properties.

The unit of acoustic matching with the cavity connected with the waveguide cavity by means of the diaphragm with a channel represents in its essence the Helmholz resonator, in which one of the walls is a membrane, used for a new purpose. In this construction the unit appears in two roles: a matcher and absorber.

Helmholz resonators are usually used in acoustics as resonance absorbers in sound-absorbing constructions. See "Reference Book on Technical Acoustics", translated from German, edited by M. Hekl and H. A. Muller, Leningrad, Shipbuilding, 1980, pp. 309–313.

In this construction it is used as a matching element between the acoustical-electrical transducer and acoustic waveguide both in the reception mode and the emission mode which allows maximal use of oscillating membrane energy at emission and maximal conversion of legitimate signal into membrane oscillations at reception.

Application of sleeve coupling between the device case and the waveguide provides rigidity and adaptability to manufacture of the construction. Parasitic vibration and acoustic oscillations do not penetrate to the acoustical-electrical transducer due to the damping element which is installed between the case and the transducer.

DESCRIPTION OF THE INVENTION

Figure 1:
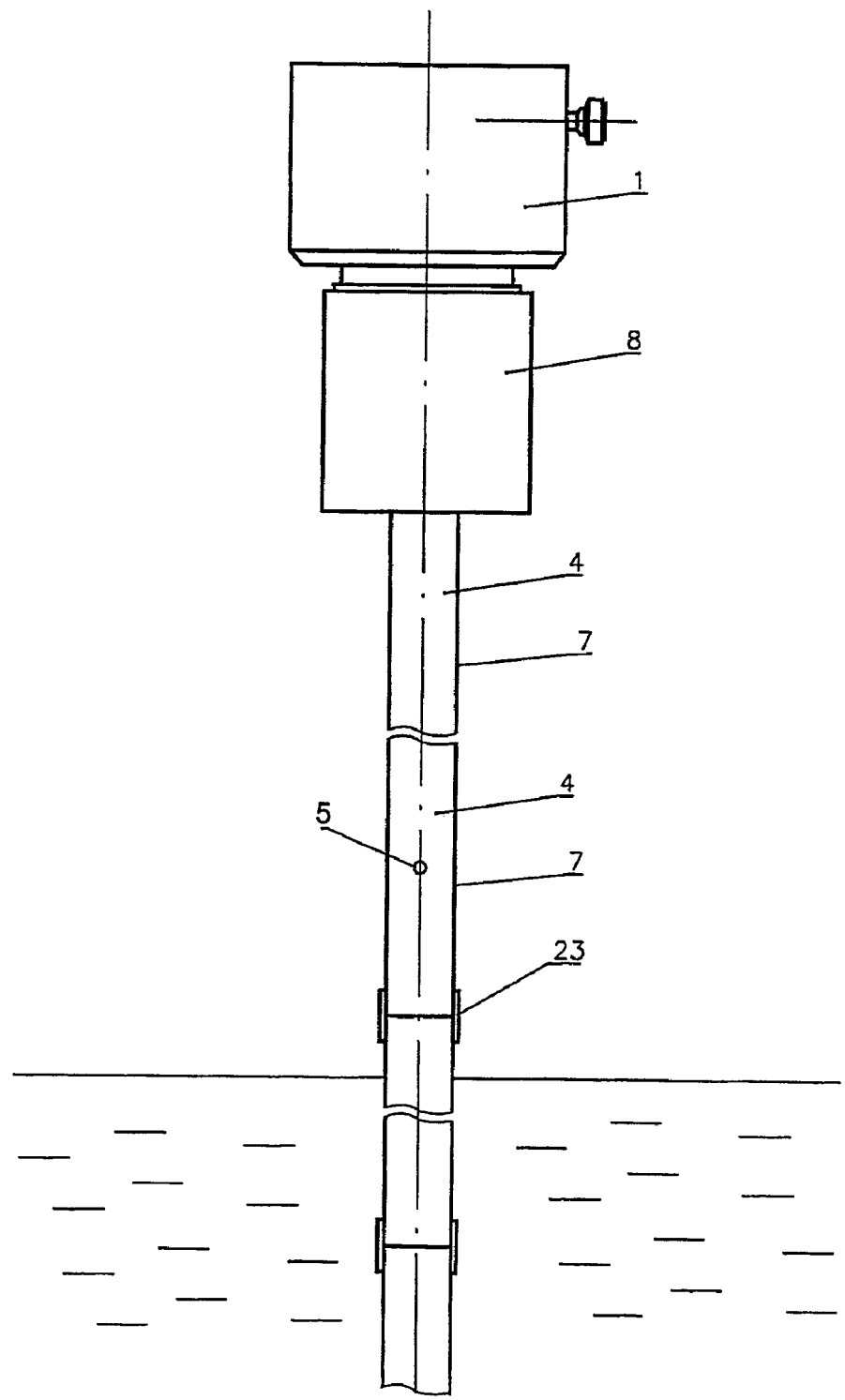
FIG. 1 shows the general construction of the device.
Figure 2:
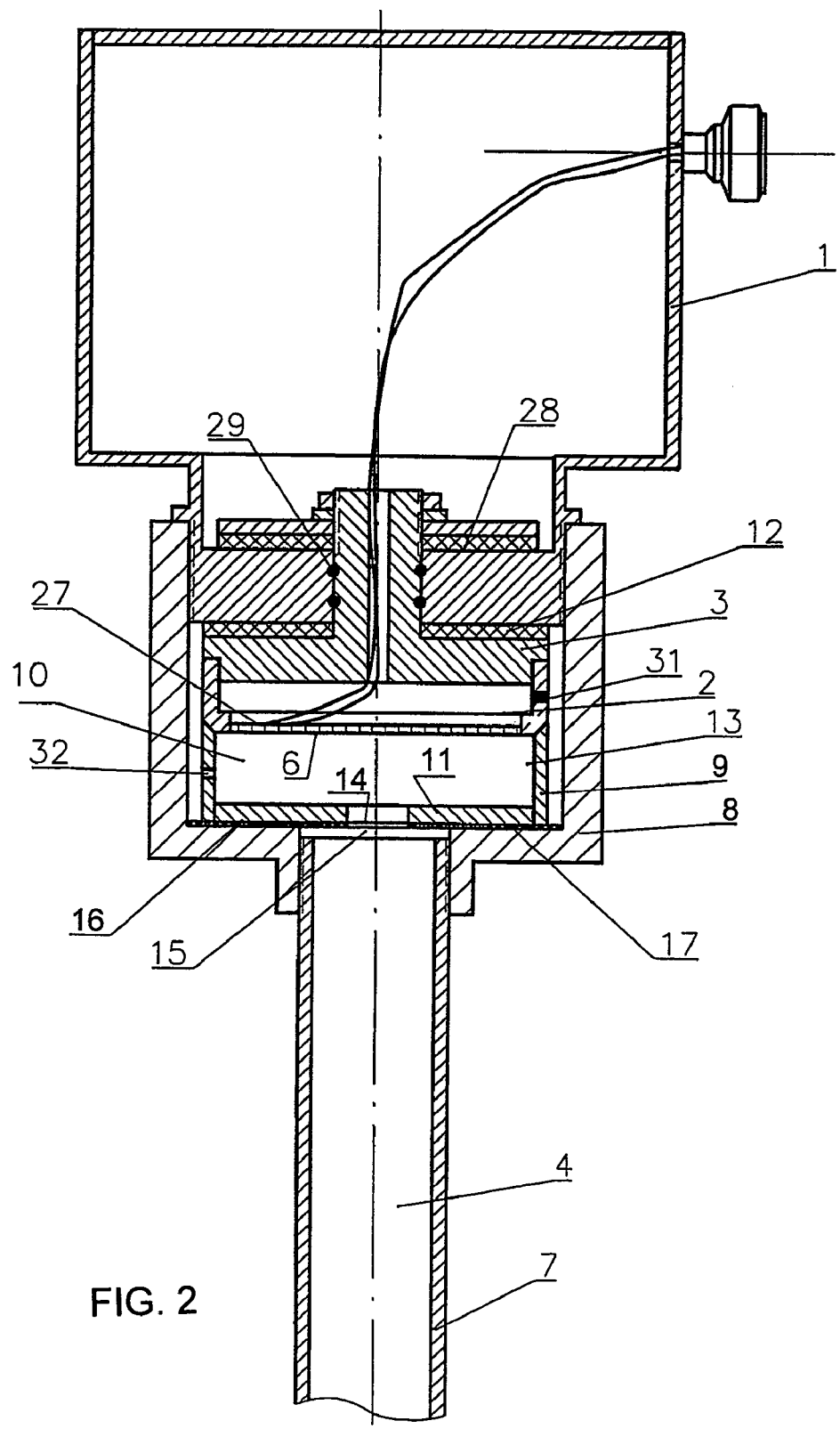
FIG. 2 shows the device's section.

The liquid level detector contains an acoustical-electrical transducer 2 with a membrane 6 in a body 3 and an acoustic waveguide 4 with reflectors 5 immersed into a liquid. See FIG. 1 and FIG. 2.

The acoustic waveguide 4 is made in the form of the tube or several tubes 7 and is connected to a body 1 of the detector by means of a sleeve coupling 8. Inside the sleeve coupling 8 between a membrane 6 of the acoustical-electrical transducer 2 and an outlet of the waveguide 4, an acoustic matching unit 9 with a cavity 10 is implemented, see FIG. 2. The cavity 10 is connected with the cavity of the waveguide by means of a diaphragm 11 with a channel 14.

The body 3 of the acoustical-electrical transducer 2 is connected to the detector body 1 through a damping element 12 serving as an acoustic decoupling between the acoustical-electrical transducer 2 and the detector case 1. In order for the body 3 of the acoustical-electrical transducer 2 to be completely acoustically decoupled from the detector body 1 it is installed through the rubber rings 29 and is attached through a damping gasket 28. The acoustical-electrical transducer 2 as well as the main body 1 is made hermetic, for example, a piezoelectric element 27 working in emission and reception is attached on the membrane 6 from the internal side. Note that the acoustical-electrical transducer may be electromagnetic, i.e., oscillations of the membrane from ferromagnetic material may be produced and received by an electromagnet, such as a coil with a core. The electric circuits providing generation of signals fed to the piezoelectric element (to the acoustical-electrical transducer) and circuits for signals processing are not shown in figures.

The acoustic matching unit 9 is made in the form of a cup 13 with the channel 14 of the diaphragm 11, in this case the cavity 10 of the cup 13 faces the membrane 6, and the channel 14 in the cup 13 faces the opening 15 of the sleeve coupling 8. A surface 16 of the cup 13 facing the opening 15 of the sleeve coupling 8 is covered with a damping material 17.

The cup 13 may consist of a bushing 18 and the diaphragm in the form of the washer 19. See FIG. 3.

Figure 3:
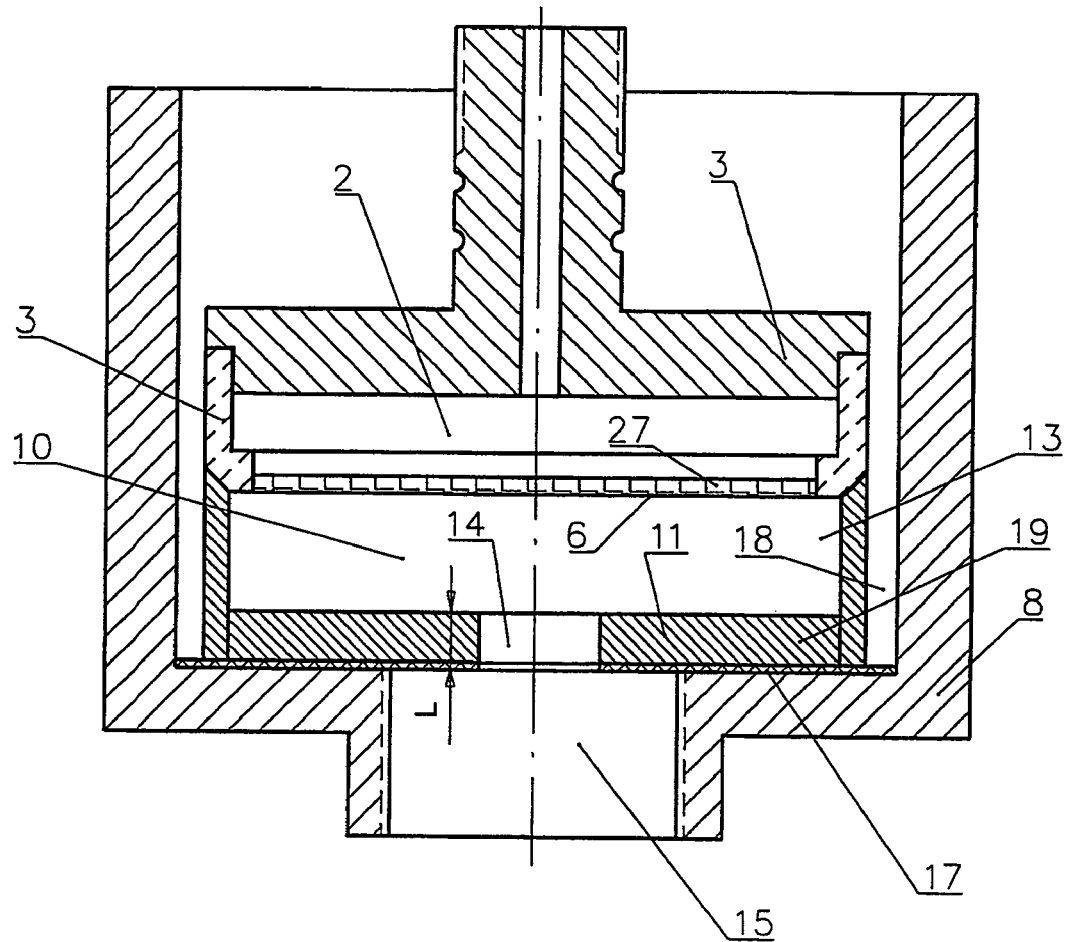
FIG. 3 shows the construction of the acoustic matching unit.
Figure 4:
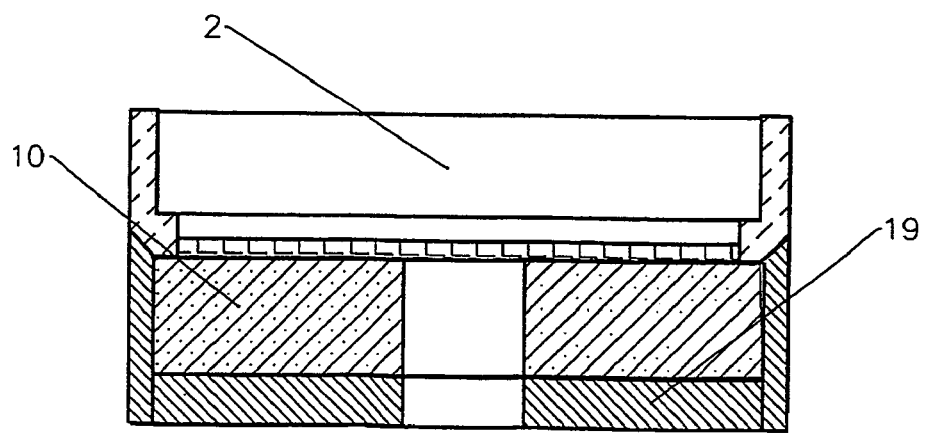
FIG. 4 shows the construction of the acoustic matching unit with the cavity filled by the porous material.

The FIG. 3 shows the cavity 10, channel 14 of the diaphragm 11 and its length L is indicated. The dimensions of the cavity 10 and the dimensions of the channel 14 of the diaphragm 11 are linked by the equation (1), as shown above. The FIG. 4 shows the cup cavity filled with the porous material. In construction the cavity can be filled by the material in the form of one or several washers.

Figure 6:
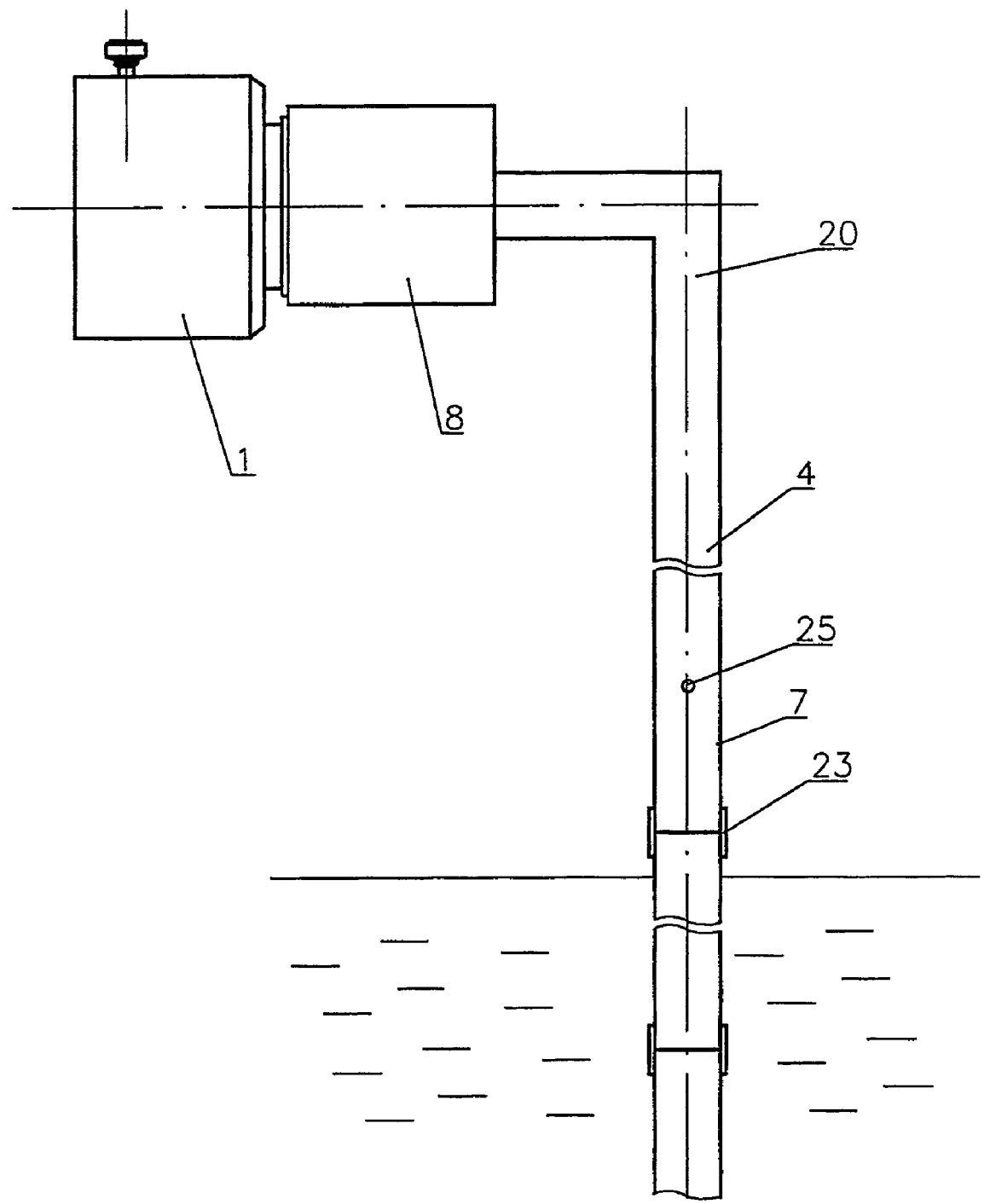
FIG. 6 shows a device with the Γ-shaped intermediate waveguide.

It is convenient in some cases when the main detector body 1 and the sleeve coupling 8 are arranged on one side at the angle to the acoustic waveguide 4. See FIG. 6 and FIG. 7. Then the intermediate acoustic waveguide of Γ-shaped 20, see FIG. 6, or T-shaped 21 form, see FIG. 7, is installed between the sleeve coupling 8 and acoustic waveguide 4, and the sleeve coupling 8 is connected to the part of the intermediate acoustic waveguide 20 and 21 placed at the angle to the acoustic waveguide 4.

In case of the detector made with the intermediate waveguide the section of the intermediate acoustic waveguide from the sleeve coupling 8 to the axis of the acoustic waveguide 4 has the length in the range of $$(1 \div 3) \cdot \frac{c}{2f_0},$$

as shown in the equation (2) above.

Figure 7:
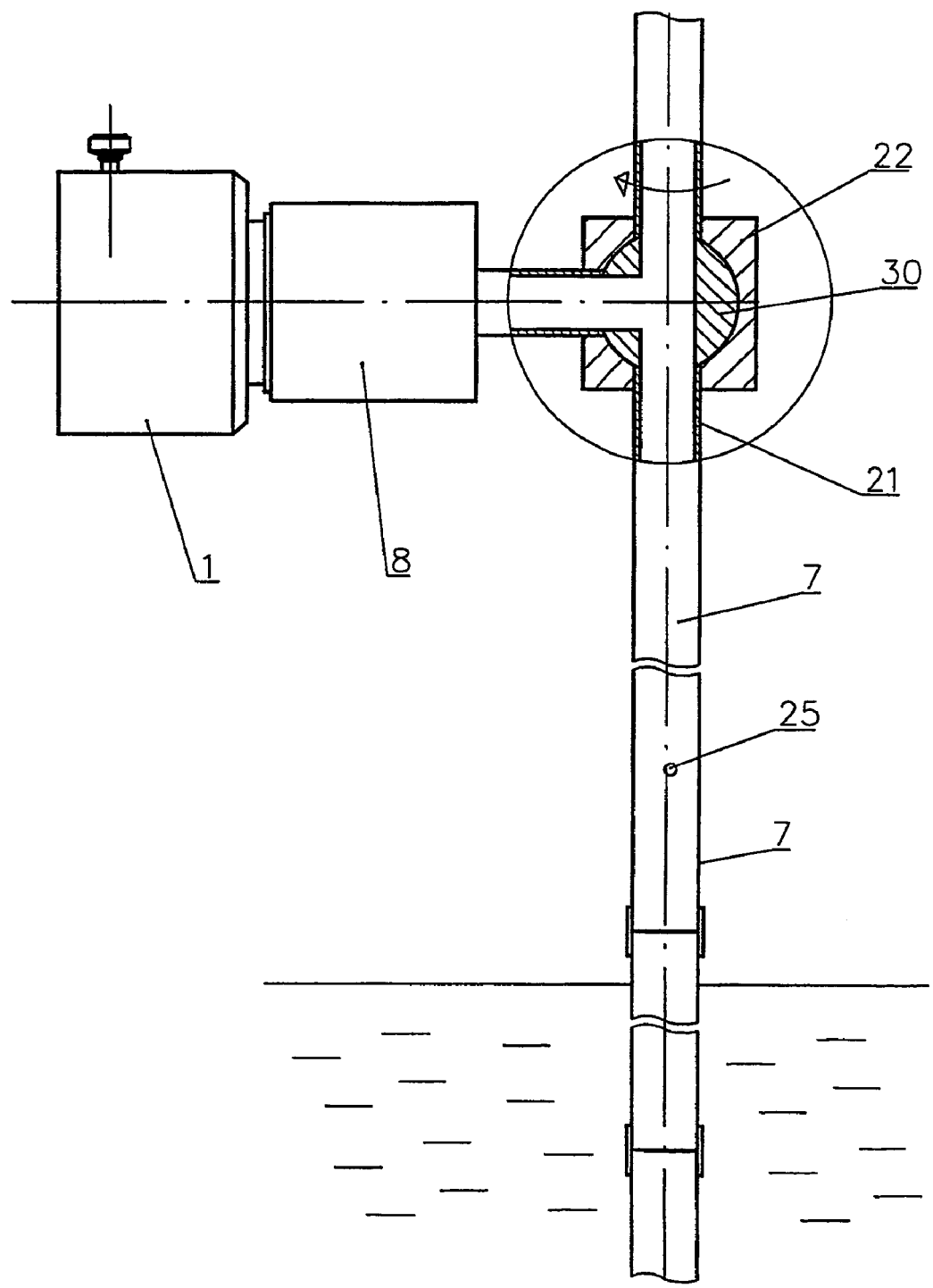
FIG. 7 shows a device with the T-shaped intermediate waveguide and the ball valve.

At the bend of the Γ-shaped or T-shaped intermediate acoustic waveguide 20 and 21, a ball valve 22 may be installed with a cut off overlapping element 30 in the form of the ball with the holes as it is shown in FIG. 7. In one position of the ball valve 22, the cavity 10 of the acoustic matching unit 9 is connected with the cavity of the acoustic waveguide 4, and in the another position, the cavity of the acoustic waveguide 4 is connected with the environment.

The acoustic waveguide 4 is made of separate tubes 7 connected with adapters 23, which allows easy mounting. Further, at the tubes' joints, the reflectors in the form of the washers 24 of the reflector may be installed with the diameter that differs from the internal diameter of the tube 7, see FIG. 5.

Figure 5:
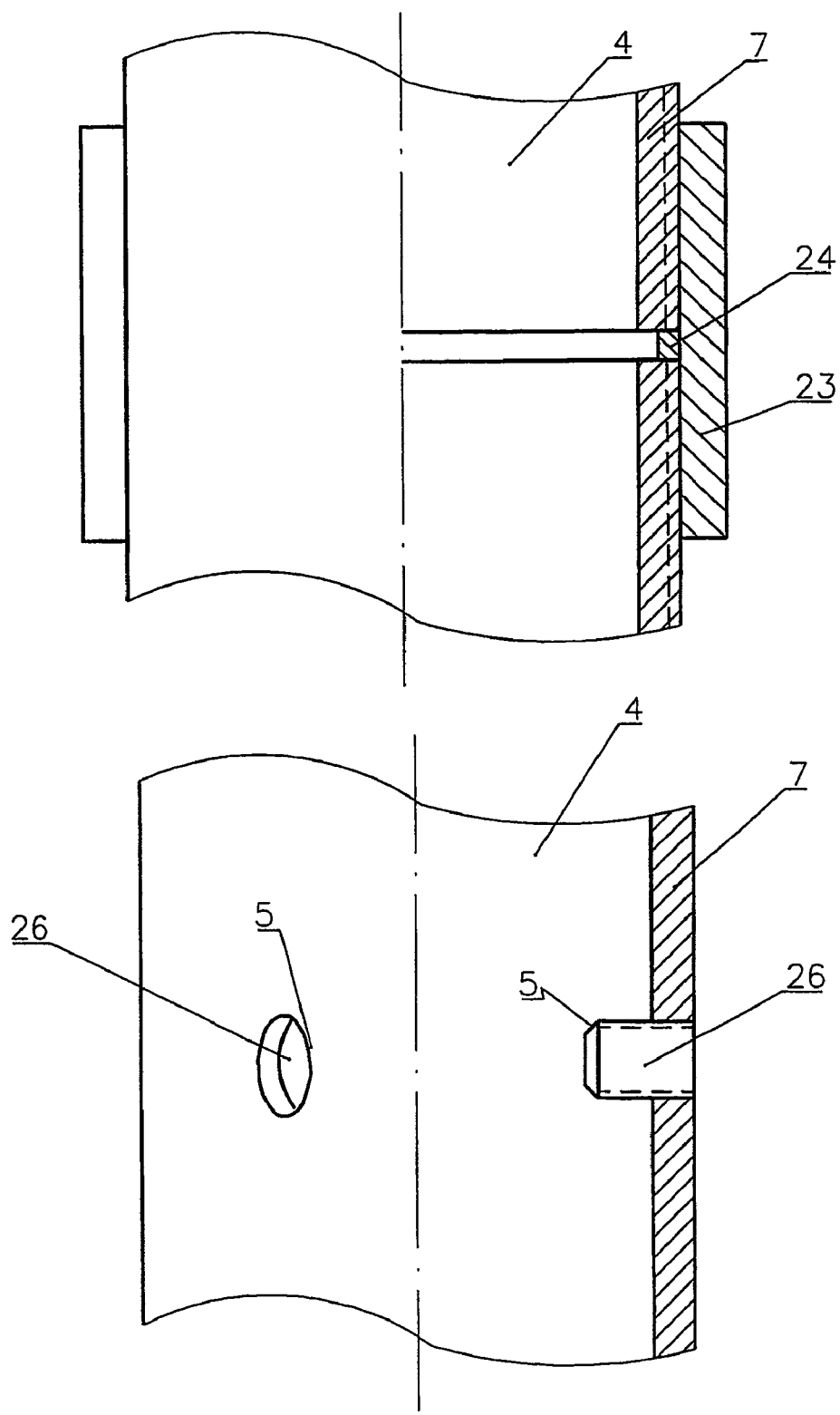
FIG. 5 shows the construction of the reflectors installed on the waveguide.

Further, the reflectors 5 along the length of the tube 7 may be made in the form of the holes 25 or in the form of the rods 26 fixed in the internal walls of the tubes 7 perpendicular to the axis of the acoustic waveguide 4, see FIG. 5.

The compensation holes 31 and 32 are made to equalize the pressure in the measured reservoir and the pressure in the cavity of the acoustical-electrical transducer 2 to provide normal operating condition of the membrane 6. In the compensation hole 31 made in the acoustical-electrical transducer body 3, a filter permeable to air and opaque to moisture is installed, as the moisture may prevent a piezoelectric element 27 from operating.

The liquid level detector operates in the following way.

An impulse signal generator (not shown in figures) produces a periodic sequence of rectangular radio impulses in the narrow range of frequencies that are fed (for example) on the thin disk piezoelectric element 27. Bending oscillations of the piezoelectric element 27 excite the membrane 6 radiating short impulse acoustic signals. The acoustic wave propagates through the cavity 10 of the acoustic matching unit 9, along the channel 14 of the diaphragm 11 and propagates in the tube 7 of the acoustic waveguide 4 in the gaseous medium. The geometric dimensions of the cavity 10 of the acoustic matching unit 9 are selected in such a way that the output acoustic resistance of the membrane 6 and that of the load (acoustic channel with the waveguide) are equal. The acoustic matching unit 9 by selection of geometric dimensions is adjusted to resonance with the membrane 6 at the operating frequency.

When passing along the acoustic waveguide 4, the acoustic wave reflects from the reflectors 5 situated higher than the liquid level. The reflective properties of the reflectors 5 are selected so that the amplitude of the reflected signals was several times smaller (at least 10 times) than the amplitude of the signal reflected from the liquid surface. The reflectors 5 work as reference points the distance to which is known precisely before, that allows to take into consideration changing properties of the environment when processing the reflected signals. The reflectors 5 in the form of the holes 25 usually are combined with the reflectors in the form of the rods 26. If the holes 26 are closed, for example, by liquid drops due to the surface tension forces the reference points do remain.

It should be noted that the holes 26 may also play the role of the drainage holes allowing to equalize the levels of the measured medium inside the waveguide and outside it even in case of layered medium.

In the reception mode for the signals reflected from the liquid surface and reflectors 5, the acoustic waveguide 4 is a source and is connected to the channel 14 of the acoustic matching unit 9. Wave resistance (or characteristic wave impedance) of the waveguide 7 is also matched with the input resistance of the acoustic matching unit 9 and the membrane 6.

It is an important that the acoustic matching unit 9 reduces secondary signals reflections from the internal construction of the acoustic channel thus reducing secondary reflections of the acoustic signals. Thus the ratio signal/noise is improved (the ratio of the legitimate signal to parasitic signals of multiple re-reflection), and ultimately, the accuracy of the liquid level detector improves.

To allow the detector to operate well when Γ-shaped or T-shaped intermediate acoustic waveguide is used, it is necessary that the section length of the intermediate acoustic waveguide from the sleeve coupling to the axis of the acoustic waveguide be determined by the expression (2).

If the detector contains the ball valve 22 then the channel to the measuring device may be closed, and washing solution, for example, for reservoir and tubes cleaning may be fed into the cavity of the tube 7. The length of the end cavities of the cut off element should be determined by the equation (2). A mechanical detector of the liquid level may be lowed through the tube cavity as well.

The liquid level detector may be applied in different fields of technology for the level determination of any liquids including the aggressive ones. Its application allows achieving greater noise immunity and accuracy of measurements.

What is claimed is:

1. A liquid level detector comprising
a detector body,
a damping element,
an acoustical-electrical transducer comprising
    a transducer membrane, and
    a transducer body coupled to the detector body by the damping element,
a sleeve with an opening,
an acoustic waveguide coupled to the detector body by the sleeve and comprising
    a tube or tubes,
    reflectors,
    a waveguide cavity, and
    a waveguide inlet, and
an acoustic matching unit positioned inside the sleeve between the transducer membrane and the waveguide inlet and comprising
    a diaphragm with a channel and
    a cavity coupled to the waveguide cavity by the diaphragm with the channel, the damping element providing acoustic and vibration decoupling of the transducer body and the detector body.

2. The detector of claim 1 wherein the acoustic matching unit is shaped as a cup, the diaphragm with the channel forms the base of the cup, the cavity of the cup faces the transducer membrane, and the channel of the diaphragm faces the opening of the sleeve.

3. The detector of claim 2 wherein the cavity of the cup is filled with a damping material.

4. The detector of claim 2 wherein the external surface of the cup facing the sleeve is covered with a damping material.

5. The detector of claim 2 wherein the cup comprises a bushing and the diaphragm with the channel is shaped as a washer and is separable from the bushing.

6. The detector of claim 1 wherein the volume of the cavity of the acoustic matching unit and the dimensions of the channel of the diaphragm are connected as $$f_0 = \frac{c}{2\pi}\sqrt{\frac{S}{V \cdot L}}$$

where
- $f_0$ is an operating frequency of the acoustical-electrical transducer,
- c is the speed of sound,
- S is the cross-section area of the channel of the diaphragm,
- V is the volume of the cavity of the acoustical-electrical transducer, and
- L is the length of the channel of the diaphragm.

7. The detector of claim 1 wherein the acoustical-electrical transducer is hermetic.

8. The detector of claim 1 wherein the tubes of the acoustic waveguide are connected to each other by adapters.

9. The detector of claim 1 wherein the reflectors comprise reflective washers located at junctures of the tubes, the internal diameter of each washer being different from the internal diameters of the joined tubes.

10. The detector of claim 1 wherein the reflectors comprise holes located along the tube or tubes.

11. The detector of claim 1 wherein the reflectors comprise rods fixed in walls of the tube or tubes.

12. The detector of claim 1 wherein the acoustical-electrical transducer comprises a cavity, the transducer body comprises a compensation hole, and the acoustic matching unit comprises a compensation hole, the compensation holes equalizing pressure between the waveguide cavity and the cavity of the acoustical-electrical transducer, and further comprising a filter opaque to moisture and permeable to gas installed in the compensation hole of the transducer body.

13. A liquid level detector comprising
- a detector body,
- a damping element,
- an acoustical-electrical transducer comprising
  - a transducer membrane, and
  - a transducer body coupled to the detector body by the damping element,
- a sleeve with an opening,
- an acoustic waveguide comprising
  - a tube or tubes,
  - reflectors,
  - a waveguide cavity, and
  - a waveguide inlet,
- a Γ-shaped or T-shaped intermediate acoustic waveguide coupled to the detector body by the sleeve and coupled to the acoustic waveguide at an angle to a section of the intermediate waveguide coupled to the sleeve, and
- an acoustic matching unit positioned inside the sleeve between the transducer membrane and the waveguide inlet and comprising
  - a diaphragm with a channel and
  - a cavity coupled to the waveguide cavity by the diaphragm with the channel,
- the damping element providing acoustic and vibration decoupling of the transducer body and the detector body.

14. The detector of claim 13 wherein the acoustic matching unit is shaped as a cup, the diaphragm with the channel forms the base of the cup, the cavity of the cup faces the transducer membrane, and the channel of the diaphragm faces the opening of the sleeve.

15. The detector of claim 14 wherein the cavity of the cup is filled with a damping material.

16. The detector of claim 14 wherein the external surface of the cup facing the sleeve is covered with a damping material.

17. The detector of claim 14 wherein the cup comprises a bushing and the diaphragm with the channel is shaped as a washer and is separable from the bushing.

18. The detector of claim 13 wherein the volume of the cavity of the acoustic matching unit and the dimensions of the channel of the diaphragm are connected as $$f_0 = \frac{c}{2\pi}\sqrt{\frac{S}{V \cdot L}}$$

where
- $f_0$ is an operating frequency of the acoustical-electrical transducer,
- c is the speed of sound,
- S is the cross-section area of the channel of the diaphragm,
- V is the volume of the cavity of the acoustical-electrical transducer, and
- L is the length of the channel of the diaphragm.

19. The detector of claim 13 wherein the acoustical-electrical transducer is hermetic.

20. The detector of claim 13 wherein the tubes of the acoustic waveguide are connected to each other by adapters.

21. The detector of claim 13 wherein the section of the intermediate acoustic waveguide from the sleeve to the center axis of the acoustic waveguide has the length equal to the integer number of the half-wavelengths of sound in the range $$(1 \div 3) \cdot \frac{c}{2f_0}$$

where
- $f_0$ is an operating frequency of the acoustical-electrical transducer, and
- c is the speed of sound.

22. The detector of claim 13 further comprising a ball valve installed at the bend of the Γ-shaped or T-shaped intermediate acoustic waveguide, the valve at one position coupling the cavity of the acoustic matching unit to the waveguide cavity, and at another position connecting the waveguide cavity to the environment outside the detector.

23. The detector of claim 13 wherein the tubes of the acoustic waveguide are connected to each other by sleeve couplings.

24. The detector of claim 13 wherein the reflectors comprise reflective washers located at junctures of the tubes, the internal diameter of each washer being different from the internal diameters of the joined tubes.

25. The detector of claim 13 wherein the reflectors comprise holes located along the tube or tubes.

26. The detector of claim 13 wherein the reflectors comprise rods fixed in walls of the tube or tubes.

27. The detector of claim 13 wherein the acoustical-electrical transducer comprises a cavity, the transducer body comprises a compensation hole, and the acoustic matching unit comprises a compensation hole, the compensation holes equalizing pressure between the waveguide cavity and the cavity of the acoustical-electrical transducer, and further comprising a filter opaque to moisture and permeable to gas installed in the compensation hole of the transducer body.

* * * * *